Patented Oct. 15, 1946

2,409,413

UNITED STATES PATENT OFFICE 2,409,413

STABILIZED CUPROUS OXIDE

Harold J. Becker, Rahway, N. J., assignor to Merck & Co., Inc., Rahway, N. J., a corporation of New Jersey No Drawing. Application June 17, 1942,
Serial No. 447,479

2 Claims. (Cl. 23—147)

This invention relates to new and useful improvements in stabilized cuprous oxide.

Cuprous oxide, also referred to as red copper oxide, is subject to oxidation which is evident by color change from the red color of cuprous oxide to that of the black copper oxide. One object of my invention comprises, inter alia, a substantially stabilized cuprous oxide, i. e., a cuprous oxide substantially free from oxidative deterioration.

In accordance with my invention, a cuprous oxide preferably prepared by electrolytic methods, is provided with a coating of a suitable gum, resin or heavy metal salt of a higher fatty acid. In accordance with the preferred application of my invention, a subdivided or particled cuprous oxide is so treated in which case each particle of the cuprous oxide is surface coated.

Suitable gums, i. e., substances composed of C, H and O, which are either soluble in water or take up water forming a glutinous semi-solution, in accordance with my invention, may be, for instance, dextrin, acacia, and tragacanth. Suitable resins may be, for instance, rosin, gutta percha or the like, these terms being used generically, the term rosin, for instance, including abietic acid or the like. Among the metal salts of higher fatty acids useful in accordance with my invention, I have found copper oleate and tin oleate to give satisfactory results.

Within the preferred application of my invention, my novel stabilized cuprous oxide may be prepared as follows: A freshly prepared cuprous oxide is thoroughly washed. The coating or inhibitor substance is thoroughly contacted with dry cuprous oxide or with wet cuprous oxide which, as a matter of convenience, may contain from about 30 to 40% of water. Thorough contacting is effected, for instance, by mixing. Although the inhibitor or coating substance may be added in some cases as such, I prefer to add the same in the form of a solution in a suitable solvent. The mixing is continued until proper coating of the cuprous oxide particles is effected. The coated oxide is then dried at a convenient temperature as, for example, at or slightly in excess of 100° C. Occasional mixing during the course of the drying operation is advisable as there is otherwise sometimes danger that the coating substance or inhibitor may be drawn by capillary forces to the outside of the cuprous oxide cake. Upon drying, the cuprous oxide may be pulverized if desired.

The selection of the solvent, when adding the coating or inhibitor substance in the form of a solution, depends at least to some extent upon the nature and type of the coating or inhibitor substance to be used. If such substance is water-soluble, or at least water-gelatinizable as is for instance the case with the gums, aqueous solutions are preferable, although other solvents may be employed, if desired. For those substances not soluble or gelatinizable in water simple alcohols may be used. Excellent results are thus obtained with methyl and ethyl alcohol solutions of the afore enumerated rosins, including abietic acid. Alternatively, other organic solvents may be used. I find it thus of advantage to use benzene solutions of copper or tin oleate and in the case of gutta percha to use chloroform solutions thereof. Whenever an organic solvent solution of a coating substance or inhibitor is used, it is recommended that the mixing of the ingredients be particularly thorough so as to assure satisfactory distribution and precipitation of the coating substance onto the surface of cuprous oxide.

The following examples illustrate methods of carrying out the present invention, but it is to be understood that these examples are given by way of illustration, and not of limitation.

Example I 50 parts by weight of cuprous oxide, freshly prepared are suspended in water and filtered by suction until the filtered cake has an approximate water content of about 30 to 40%. 0.1 part by weight of dextrin (0.2% of the weight of the copper oxide) dissolved in approximately 5 parts by volume of water are added to the oxide and the mass thoroughly mixed and dried at 100° C. with frequent stirring until successive weighings indicate that the product is dry. The dry product is then powdered and exhibits excellent stability against oxidation.

Example II

Fifty parts by weight of cuprous oxide, freshly prepared, are suspended in water and filtered by suction until the filtered cake has a water content of approximately 30 to 40%. $\frac{1}{10}$ part by weight of resin is dissolved in 5 parts by volume of ethyl alcohol and added to the copper oxide. The thoroughly mixed mass is then dried and worked up as recited in Example I.

Example III

A freshly prepared sample of cuprous oxide is washed substantially free from electrolytes, and dried. To a 50 gm. portion of the dry cuprous oxide is added a solution of 0.1 gm. of resin (U. S. P. XI) in 20 cc. of alcohol, and the mass is thoroughly mixed and then dried at 80° C. with frequent mixing. The dry product is powdered. It exhibits excellent stability against oxidation.

Instead of the resin or dextrin referred to in the foregoing examples, other coating substances or inhibitors in accordance with the invention may be used such as tragacanth, acacia, quinoidine, copper or tin oleate or gutta percha. When copper or tin oleate is substituted for the resin or dextrin shown in the examples, it is preferred to use the same in benzene solution while it is found of advantage to use the gutta percha in chloroform solution.

Modifications may be made in carrying out the present invention, without departing from the spirit and scope thereof, and I am to be limited only by the appended claims.

I claim:

1. A substantially oxidation-resistant cuprous oxide powder comprising a cuprous oxide powder individual particles of which have a surface coating of dextrin.

2. The process that comprises mixing freshly prepared moist cuprous oxide powder containing about 30–40% water with an aqueous solution of dextrin, drying the mixture to constant weight, and pulverizing the dry product thereby forming a substantially oxidation-resistant cuprous oxide powder.

HAROLD J. BECKER.